United States Patent
Ohsumi

(10) Patent No.: US 9,888,227 B2
(45) Date of Patent: Feb. 6, 2018

(54) IMAGING MODULE, STEREO CAMERA FOR VEHICLE, AND LIGHT SHIELDING MEMBER FOR IMAGING MODULE

(71) Applicant: Hitachi Automotive Systems, Ltd., Hitachinaka-shi, Ibaraki (JP)

(72) Inventor: Ken Ohsumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 186 days.

(21) Appl. No.: 14/912,368

(22) PCT Filed: May 23, 2014

(86) PCT No.: PCT/JP2014/063631
§ 371 (c)(1),
(2) Date: Feb. 16, 2016

(87) PCT Pub. No.: WO2015/022796
PCT Pub. Date: Feb. 19, 2015

(65) Prior Publication Data
US 2016/0191899 A1 Jun. 30, 2016

(30) Foreign Application Priority Data
Aug. 14, 2013 (JP) .................................. 2013-168704

(51) Int. Cl.
*H04N 7/18* (2006.01)
*H04N 13/02* (2006.01)
(Continued)

(52) U.S. Cl.
CPC ......... *H04N 13/0239* (2013.01); *B60R 11/04* (2013.01); *G02B 7/20* (2013.01);
(Continued)

(58) Field of Classification Search
CPC ............. H04N 13/0239; H04N 5/2254; H04N 5/2257; G02B 7/20; B60R 11/04
(Continued)

(56) References Cited

U.S. PATENT DOCUMENTS 6,024,457 A * 2/2000 Kawai .................... G02B 7/102
359/601
2002/0047119 A1 4/2002 Honda et al.
(Continued)

FOREIGN PATENT DOCUMENTS

JP 8-248296 A 9/1996
JP 2002-262140 A 9/2002
(Continued)

OTHER PUBLICATIONS

Japanese Office Action issued in counterpart Japanese Application No. 2015-531731 dated Aug. 30, 2016 with English-language translation (fifteen (15) pages).
(Continued)

*Primary Examiner* — Robert Chevalier
(74) *Attorney, Agent, or Firm* — Crowell & Moring LLP

(57) ABSTRACT

Provided is a highly reliable imaging module that can easily carry out optical axis adjustments and focus adjustments while assuring required light shielding performance, and in which malfunctions do not easily occur in solder junctions and the like for imaging elements even under severe temperature environments. An imaging module has, in addition to a lens holding member (10), an imaging element (25), and a substrate (30) on which the imaging element (25) is mounted, a shielding member (40) that is for preventing extraneous light from entering the imaging surface of the imaging element (25) and on which a ring-shaped or notched ring-shaped protrusion (51) for shielding is provided. The shielding member (40) is held between the lens holding
(Continued)

member (10) and the substrate (30) without the protrusion (51) for shielding coming into contact with another member.

12 Claims, 5 Drawing Sheets

(51) Int. Cl.
*G03B 11/04* (2006.01)
*H04N 5/225* (2006.01)
*B60R 11/04* (2006.01)
*G02B 7/20* (2006.01)
*G02B 27/00* (2006.01)

(52) U.S. Cl.
CPC ......... *G03B 11/045* (2013.01); *H04N 5/2251* (2013.01); *H04N 5/2254* (2013.01); *H04N 5/2257* (2013.01); *G02B 27/0018* (2013.01)

(58) Field of Classification Search
USPC .................. 348/148, 143, 147, 142; 386/227
See application file for complete search history.

(56) References Cited

U.S. PATENT DOCUMENTS

| | | |
|---|---|---|
| 2002/0118471 A1 | 8/2002 | Imoto |
| 2008/0001727 A1 | 1/2008 | Ohsumi et al. |
| 2009/0316025 A1 | 12/2009 | Hirai |
| 2010/0202068 A1 | 8/2010 | Ito |
| 2014/0226080 A1* | 8/2014 | Tomomasa ........... G02B 6/0085 348/794 |

FOREIGN PATENT DOCUMENTS

| | | |
|---|---|---|
| JP | 2005-84328 A | 3/2005 |
| JP | 2005-309051 A | 11/2005 |
| JP | 2009-201079 A | 9/2009 |
| JP | 2010-26490 A | 2/2010 |
| JP | 2010-204651 A | 9/2010 |
| JP | 2011-123078 A | 6/2011 |
| JP | 2011-160365 A | 8/2011 |
| JP | 2011-209493 A | 10/2011 |
| JP | 2012-168324 A | 9/2012 |

OTHER PUBLICATIONS

Extended European Search Report issued in counterpart European Application No. 14836427.6 dated Feb. 9, 2017 (12 pages).
International Search Report (PCT/ISA/210) issued in PCT Application No. PCT/JP2014/063631 dated Sep. 2, 2014 with English-language translation (four (4) pages).
Japanese Written Opinion (PCT/ISA/237) issued in PCT Application No. PCT/JP2014/063631 dated Sep. 2, 2014 with English-language translation (eleven (11) pages).

* cited by examiner

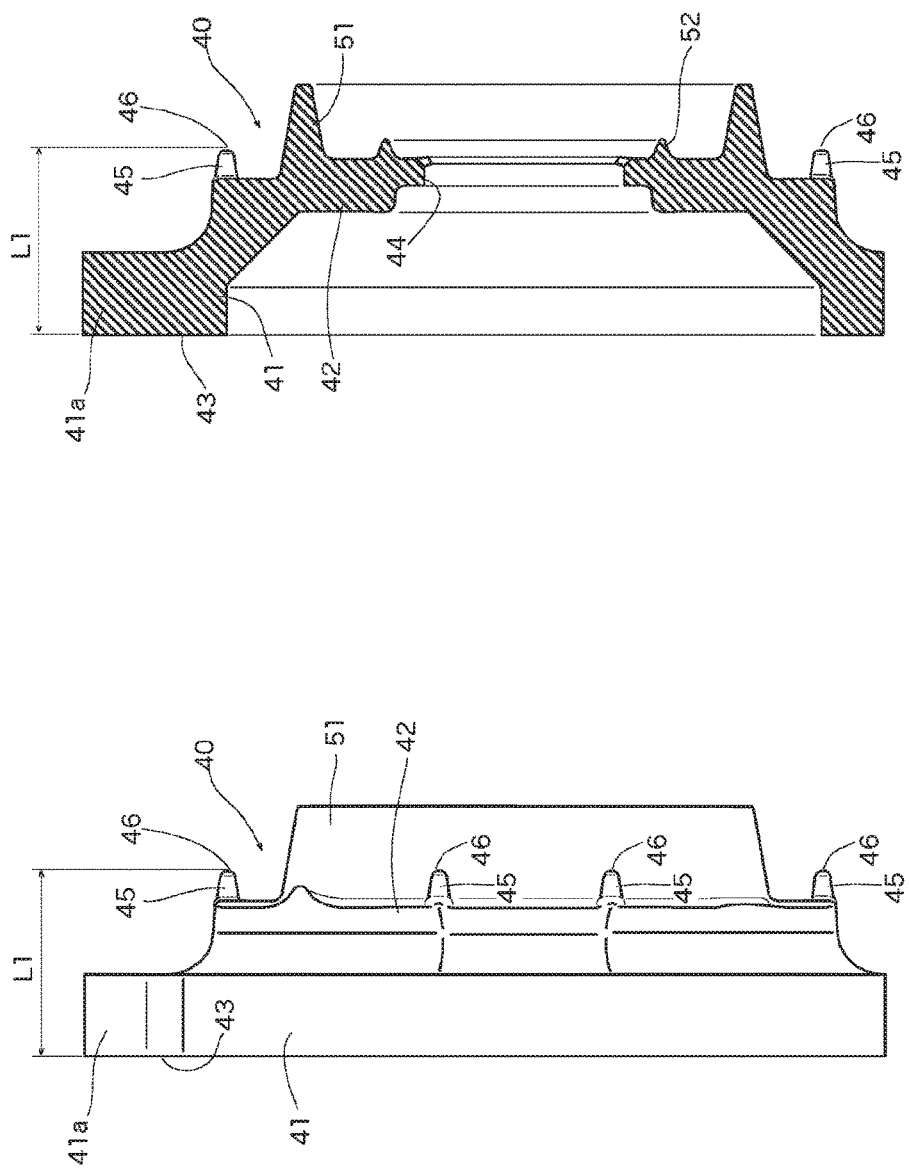

IMAGING MODULE, STEREO CAMERA FOR VEHICLE, AND LIGHT SHIELDING MEMBER FOR IMAGING MODULE

TECHNICAL FIELD

The present invention relates to an imaging module including, as basic configuration elements, a lens, an imaging element to convert light, which becomes incident through the lens, into an electric signal, and a substrate on which the imaging element is mounted, a stereo camera for a vehicle which camera includes a pair of right and left imaging modules, and a light shielding member for an imaging module.

BACKGROUND ART

Examples of an imaging module including a lens, an imaging element, and a substrate include those disclosed in PTL 1 and PTL 2.

The imaging module disclosed in PTL 1 includes a roughly box lid-shaped holder for an imaging element. On a front side of the holder, an opening into which a translucent member such as glass or a filter is attached is formed and on a rear (opening) side thereof, an imaging element is attached. Between the translucent member and the imaging element in the holder, rectangular frame-shaped rubber packing is held in a compressed manner. More specifically, a rectangular ring-shaped light shielding rib is provided in a protruded manner on an outer peripheral side of the rubber packing and a notched rectangular ring-shaped pressing rib is provided in a protruded manner on an inner peripheral side of the light shielding rib in such a manner that the rubber packing has both of a light shielding function and a holding function thereof. Protruded leading ends of the light shielding rib and the pressing rib are pressed against the imaging element.

The imaging module disclosed in PTL 2 includes a stepped short-cylindrical pressing member arranged on a substrate in such a manner as to surround an imaging element mounted on the substrate, and an O-ring (sealing member) installed between a flange part, which is provided in a lower outer periphery of the pressing member, and the substrate. The O-ring is pressed against the substrate by the pressing member, whereby air-tightness (and light-shielding property) in the pressing member (space between translucent member and substrate) is secured.

On the other hand, recently, it is becoming popular to employ a stereo camera, which includes a pair of right and left imaging modules described above, as a vehicle driving support system to support safe driving of a car (see, for example, PTL 3).

The stereo camera calculates a distance to an object by triangulation with a pair of images acquired from the pair of right and left imaging modules and recognizes the object.

Specifically, in an environment in a vehicle, it is necessary to perform measurement of a distance to a distant object and recognition thereof accurately and securely since there is an application request for, for example, detecting a leading vehicle, a person, or an obstacle and dealing therewith previously and safely.

Moreover, in a case of using the stereo camera in the vehicle driving support system or the like, high reliability is required in addition to downsizing and lowering a price.

In the stereo camera, special LSI to perform processing of specifying pixel positions of feature points, which are common in a pair of images, in pixel information included in the images and of calculating the number of pixels deviated between the feature points in the pair of pictures (hereinafter, referred to as parallax) is generally included.

For the principle, it is preferable that there is no deviation between the pair of images other than the parallax. Thus, a structure to perform adjustment accurately in such a manner that deviation in an optical characteristic or signal characteristic is not generated and to keep the accuracy is necessary for each imaging module.

Also, in order to improve performance of detecting a leading vehicle or the like, it is necessary to accurately calculate feature points common in the pair of images. Thus, it is preferable that luminance values of feature points are the same in a reference imaging module and the other imaging module.

Thus, it is preferable that extraneous light other than signal light that becomes incident through a lens does not become incident through a place other than the lens.

CITATION LIST

Patent Literature

PTL 1: Japanese Patent Application Laid-Open No. 2011-160365

PTL 2: Japanese Patent Application Laid-Open No. 2009-201079

PTL 3: Japanese Patent Application Laid-Open No. 2011-123078

SUMMARY OF INVENTION

Technical Problem

Specifically, in a case of a stereo camera, it is necessary to improve relative positional accuracy of right and left imaging modules in order to improve measurement accuracy as described above. However, since it is not possible to realize adequate performance of the stereo camera only by improving mechanical accuracy of a housing or the like, it is necessary to perform a mechanical adjustment in a production process. The mechanical adjustment is operation to adjust a positional relationship between a lens and an imaging element. In a case of the stereo camera, the lens is a reference. Thus, it is necessary to move a position of the imaging element.

Also, recently, there are increasing cases of mounting an imaging element to a substrate with solder junction by a BGA. Furthermore, since it is requested to extend a range of tolerant environmental temperature in order to deal with installation in a vehicle, it is preferable that no load is applied to the imaging element or the substrate.

However, the imaging module disclosed in PTL 1 includes a structure in which the rubber packing to function as a light shielding member applies a load to the imaging element and durability of solder in a temperature environment in a vehicle is concerned.

Also, the imaging module disclosed in PTL 2 includes a structure in which the pressing member and the O-ring which function as light shielding members apply a load to the substrate and durability of the substrate in a temperature environment in a vehicle and deviation of a focus due to a change in a temperature of the substrate are concerned.

The present invention is provided in view of the forgoing and is to provide a highly reliable imaging module which can easily carry out optical axis adjustments and focus adjustments while assuring required light shielding performance and in which malfunctions do not easily occur in solder junctions and the like for imaging elements even under severe temperature environments.

Solution to Problem

In order to achieve the above purpose, an imaging module according to the present invention basically includes a lens, a lens holding member that holds the lens, an imaging element to convert light, which becomes incident through the lens, into an electric signal, and a substrate on which the imaging element is mounted. In addition, the imaging module includes a light shielding member on which a ring-shaped or notched ring-shaped protrusion for light shielding is provided to prevent extraneous light from entering an imaging surface of the imaging element. The light shielding member is held between the lens holding member and the substrate without the protrusion for light shielding coming into contact with the other members.

Advantageous Effects of Invention

According to the present invention, a structure in which a protrusion for light shielding is not in contact with an imaging element or a substrate is included. With this structure, no load is applied to a solder junction in an imaging element or to a substrate on which the imaging element is mounted and it becomes possible to reduce a malfunction in the solder junction and the like in the imaging element even in an environment with a large temperature change or an environment with high temperature. As a result, it is possible to improve durability and reliability.

A problem, configuration, and effect other than what has been described above will be disclosed in the following embodiments.

BRIEF DESCRIPTION OF DRAWINGS

FIG. 4A is a side view of the light shielding member used in the embodiment and FIG. 4B is a cross sectional view thereof.

DESCRIPTION OF EMBODIMENTS

In the following, embodiments of the present invention will be described with reference to the drawings.

Figure 1:
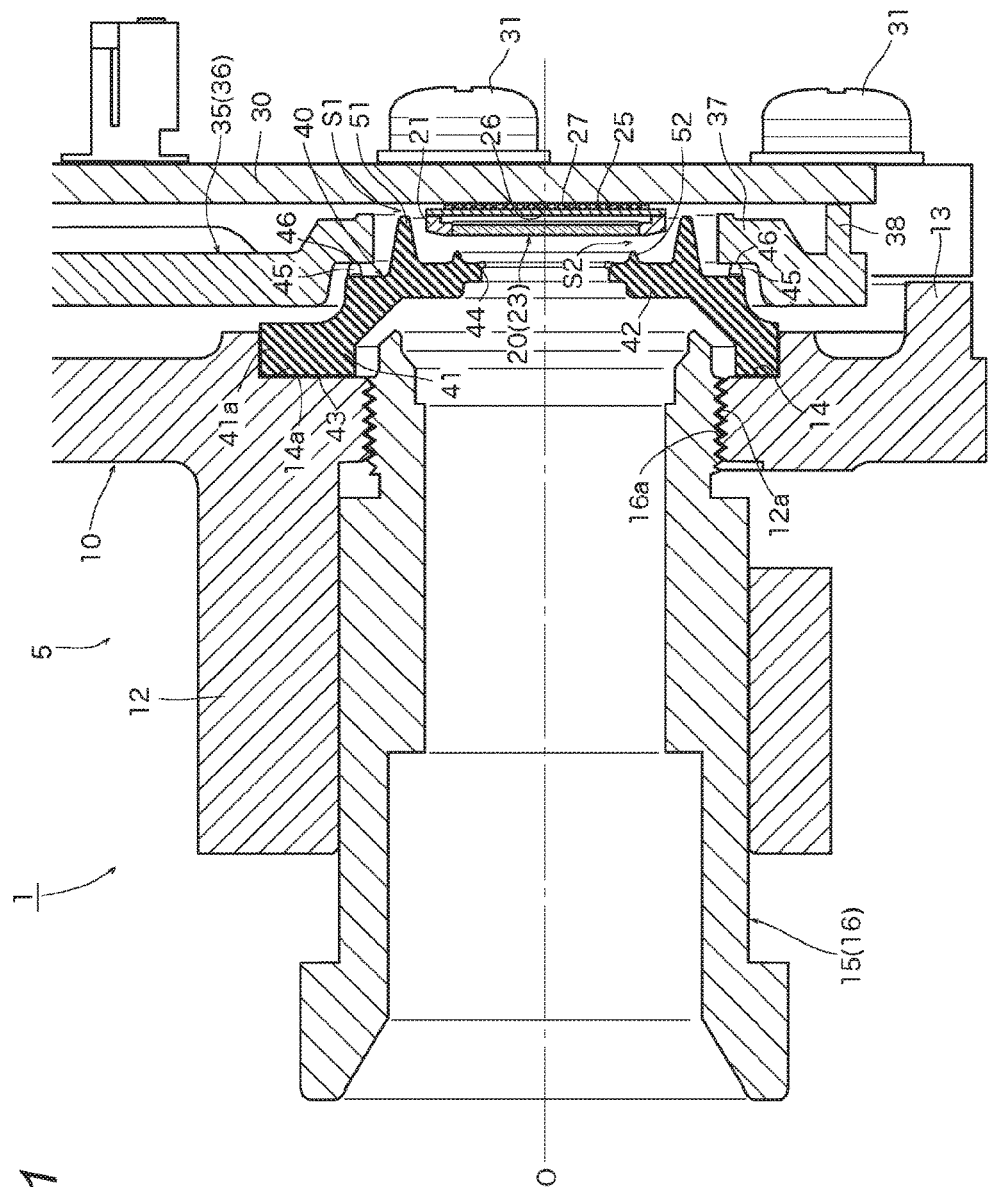
FIG. 1 is a cross sectional view illustrating a left imaging module in a stereo camera for a vehicle which camera includes an embodiment of an imaging module according to the present invention on each of right and left sides.
Figure 2:
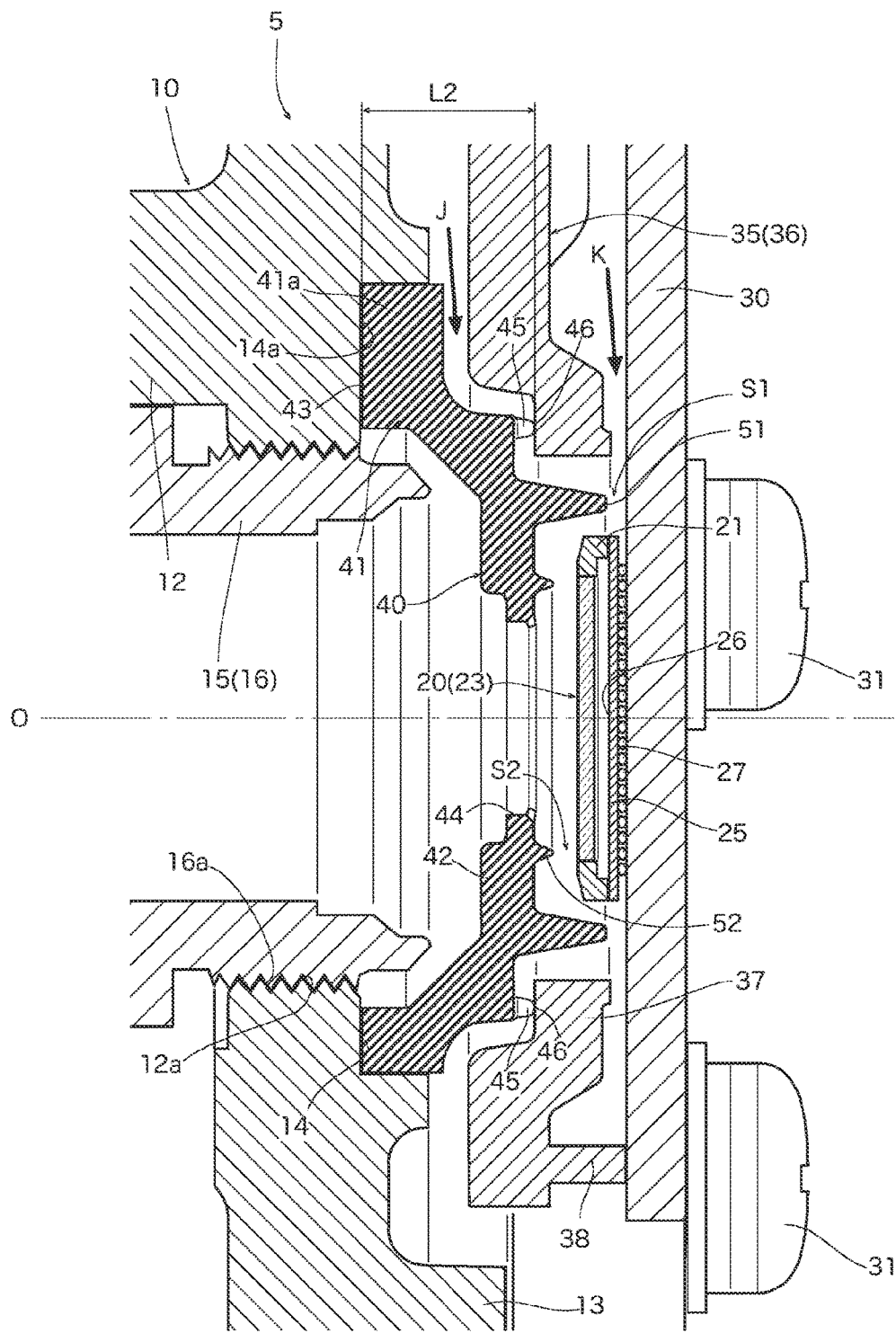
FIG. 2 is an enlarged cross sectional view of a main part of the imaging module illustrated in FIG. 1.

FIG. 1 is a cross sectional view illustrating a left imaging module in a stereo camera for a vehicle which camera includes an embodiment of an imaging module according to the present invention on each of right and left sides and FIG. 2 is an enlarged cross sectional view of a main part of the imaging module illustrated in FIG. 1.

In an illustrated stereo camera 1, an illustrated left imaging module 5 and a right imaging module 5 including a configuration substantially identical thereto are mirror-symmetrically included and (main part of) the pair of right and left imaging modules 5 and 5 are respectively assembled to a right end part and a left end part of a stay (housing) 10, which is a common configuration element, in such a manner as to be separated from each other for a predetermined distance (see PTL 3).

In the following, the illustrated left imaging module 5 will be mainly described and an overlapped description of the right imaging module 5 will be omitted.

The illustrated imaging module 5 includes a lens unit 15 inserted into and held in a cylindrical mount part 12 provided in the left end part of the stay 10, an imaging element assembly 20, a substrate 30 on which (imaging element 25 of) the imaging element assembly 20 is mounted, a holding plate 35 that holds the substrate 30, and a light shielding member 40 that configures a main characteristic part of an embodiment of the present invention.

For example, the lens unit 15 includes a stepped-cylindrical lens holder 16 including a plurality of lenses (not illustrated), a fixture thereof (not illustrated), and the like. A male screw 16a provided in a rear end part of the lens holder 16 is screwed to a female screw 12a provided in the cylindrical mount part 12. A center line of the lens unit 15 is an optical axis O.

Figure 5B:
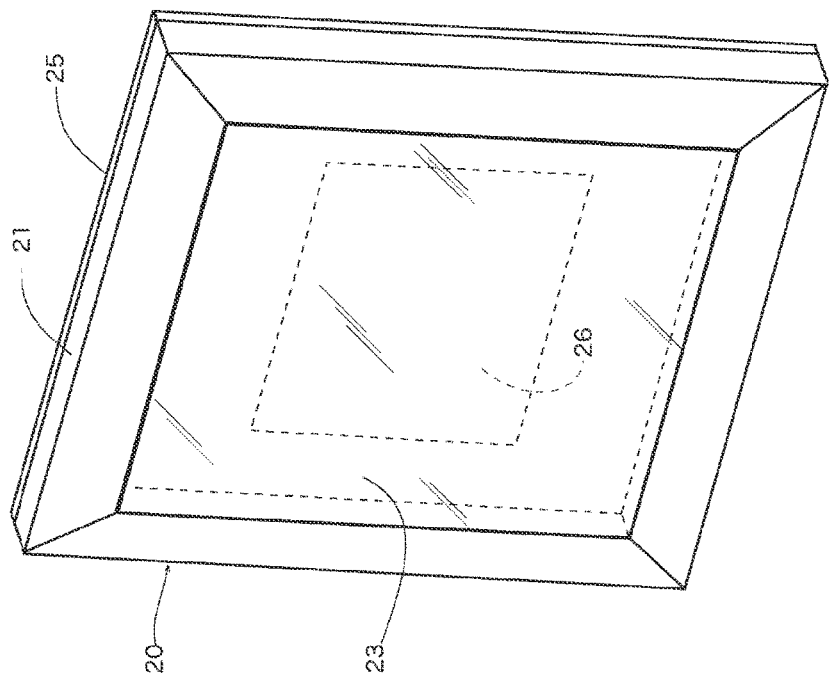
FIG. 5A is a cross sectional view for describing a solder junction between an imaging element and a substrate in an imaging element assembly used in the embodiment and FIG. 5B is a perspective view of a front side thereof.
Figure 5A:
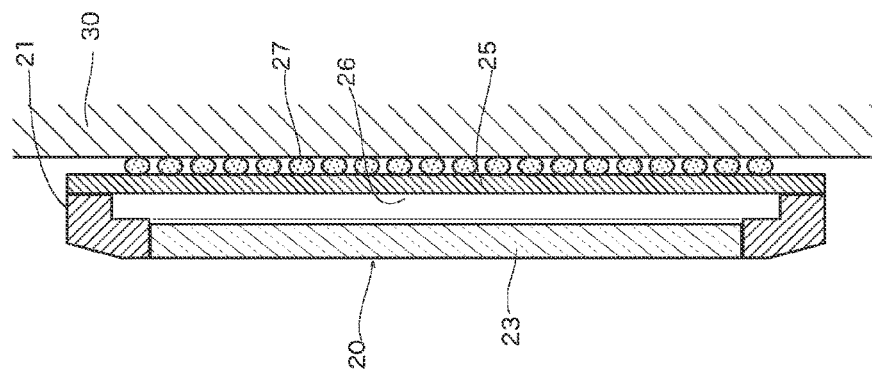

As illustrated in FIG. 5(A) and FIG. 5(B), the imaging element assembly 20 includes a frame member 21 having a rectangular opening on a front side, a cover glass 23 airtightly fitted to the rectangular opening, and a rectangular plate-like imaging element 25 an outer peripheral part of which is airtightly fixed to a rear side of the frame member 21. A center part on a front side of the imaging element 25 is an imaging surface 26.

Wiring lines on the imaging element 25 and the substrate 30 are electrically connected to each other by soldering. More specifically, as illustrated in FIG. 5(A), the imaging element 25 is mounted on the substrate 30 by junction with a BGA solder ball 27.

The substrate 30 on which the imaging element 25 is mounted in such a manner is fixed to the holding plate 35 with the predetermined number of set screws while an outer periphery thereof is abutted to a ring-shaped protruded part 38 provided in a protruded manner on a planar base body 36 of the holding plate 35. After an adjustment of a position (position in direction of optical axis O, direction orthogonal to optical axis O, and rotational direction), the holding plate 35 is attached and fixed, with a screw or the like, to an inner peripheral side of a ring-shaped protruded part 13 provided in the left end part of the stay 10.

Here, the adjustment of a position of the holding plate 35 with respect to the stay 10 is performed to adjust a positional relationship between the lens and the imaging element 25, that is, to place the center of the imaging surface 26 of the imaging element 25 on the optical axis O, to make the imaging surface 26 orthogonal to the optical axis O, to determine a position of the imaging element 25 in a rotational direction, and to make a distance between the imaging surface 26 and the lens a prescribed value.

Then, the light shielding member 40 is arranged between a ring-shaped groove 14 provided in a rear part of the cylindrical mount part 12 of the stay 10 and a recessed receiving part with an opening 37 provided in the holding plate 35.

Figure 3B:
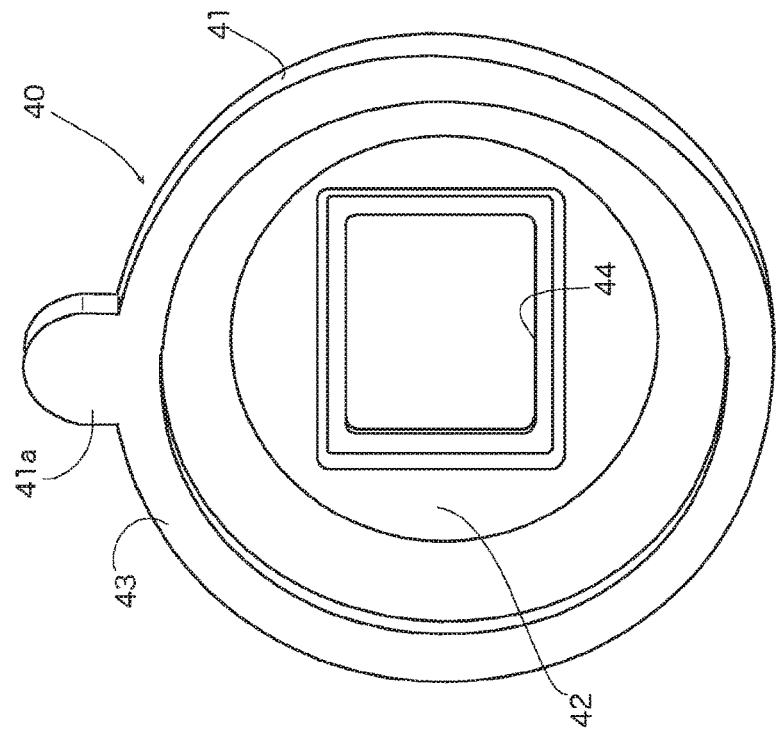
FIG. 3A is a perspective view of a rear side of a light shielding member used in the embodiment and FIG. 3B is a perspective view of a front side thereof.
Figure 3A:
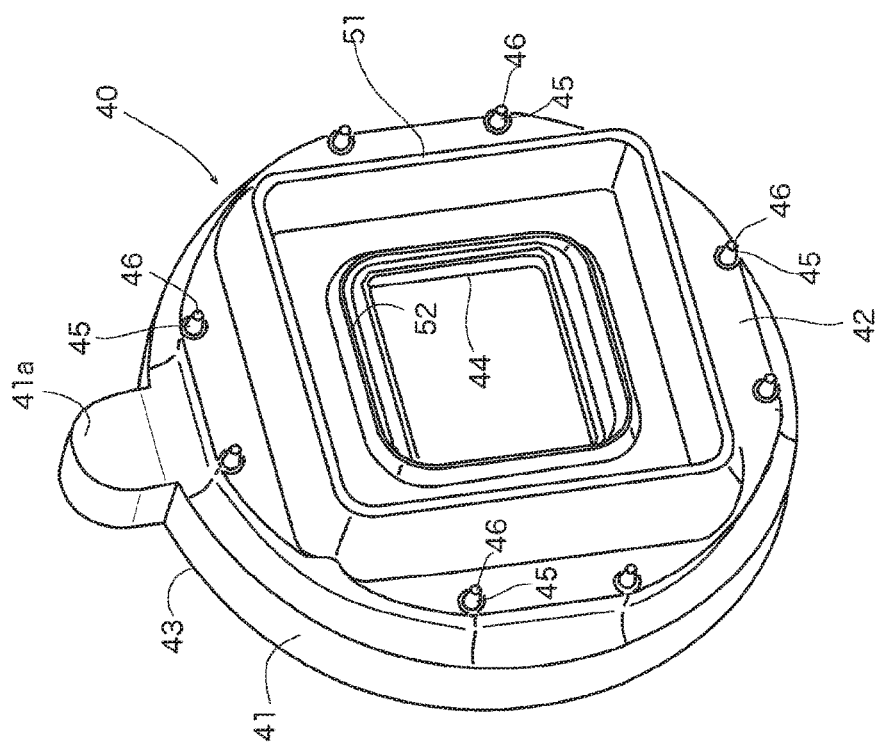

The light shielding member 40 prevents light (extraneous light) other than desired signal light that becomes incident through a lens from entering the imaging surface 26 of the imaging element 25. As illustrated in FIG. 3 and FIG. 4 in addition to FIG. 1 and FIG. 2, the light shielding member 40 includes a ring-shaped base part 41 fitted into the ring-shaped groove 14 of the stay 10 and a top part 42 protruded from the base part 41 in a direction orthogonal thereto (direction of optical axis O and direction toward side of substrate 30). In the base part 41, a semi-oval protrusion 41a for positioning which protrusion is used for positioning in a rotational direction with respect to the optical axis O of the lens is provided in a manner protruded outward in a radial direction. Also, at the center of the top part 42, a rectangular window 44 for limiting an optical path which window is to prevent unneeded light from entering the imaging surface 26 is formed with respect to a path of the light that becomes incident through the lens.

Note that the protrusion 41a for positioning is fitted into a groove 14a for positioning which groove is formed continuously with the ring-shaped groove 14. The base part 41 is tightly fitted into the ring-shaped groove 14 of the stay 10 and the protrusion 41a for positioning is tightly fitted into the groove 14a for positioning, whereby positioning of the light shielding member 40 with respect to the stay 10 is performed. The positioning may be performed, for example, by a method of fitting the protrusion 41a for positioning into the groove 14a for positioning as illustrated in the drawing or a method of forming each of an outer shape of the base part 41 of the light shielding member 40 and that of the ring-shaped groove 14 as a non-circular shape such as a quadrangle.

Near an outer peripheral end of the top part 42 of the light shielding member 40, a triangular or trapezoidal first protrusion 51 for light shielding, which has a rectangular ring shape as a whole and a cross section of which becomes smaller on a leading end side, is provided in a manner protruded toward the substrate 30 (in direction of optical axis O) in such a manner as to surround an outer periphery of a side of the imaging element assembly 20. Also, in a position which is on an inner peripheral side of the first protrusion 51 for light shielding in the top part 42 and which faces an outer peripheral end of the cover glass 23 of the imaging element assembly 20, a triangular or trapezoidal second protrusion 52 for light shielding which protrusion has a rectangular ring shape as a whole, a cross section of which protrusion becomes smaller on a leading end side, and which protrusion is much smaller than the first protrusion 51 for light shielding is provided in a manner protruded toward the cover glass 23 (in direction of optical axis O).

Between a leading end of the first protrusion 51 for light shielding and the substrate 30, a predetermined gap S1 is formed and a height and the like of the first protrusion 51 for light shielding are set in such a manner not to be in contact with the substrate 30 or any other parts.

Also, a predetermined gap S2 is formed between the second protrusion 52 for light shielding and the cover glass 23 of the imaging element assembly 20. A height and the like of the second protrusion 52 for light shielding are also set in such a manner not to be in contact with the cover glass 23 or any other parts.

As a material of the light shielding member 40, a material with flexibility and elasticity such as silicone rubber is preferably used in such a manner that it becomes possible to deal with a change in a provided space due to a variation in production of the member.

Moreover, on each of up, down, right, and left sides of the outer peripheral end of the top part 42 of the base part 41, a pair of half-barrel-shaped or truncated cone-shaped protrusions 45 for supporting, eight in total, which protrusions become smaller on a leading end side and are provided to hold the light shielding member 40 with pressure between the ring-shaped groove 14 of the stay 10 and the recessed receiving part 37 of the holding plate 35 is equally provided in a manner protruded toward the side of the holding plate 35 (in direction of optical axis O).

Here, in order to hold the light shielding member 40 with pressure between the ring-shaped groove 14 of the stay 10 and the recessed receiving part 37 of the holding plate 35, a size and a shape of each part are set in such a manner that a distance L2 between (bottom surface of) the ring-shaped groove 14 of the stay 10 to which a front end surface 43 of the base part 41 is pressed and the recessed receiving part 37 of the holding plate 35 to which a leading end surface 46 of the protrusion 45 for supporting is pressed in an assembled state illustrated in FIG. 2 becomes shorter than a length (natural length) L1 from the front end surface 43 of the base part 41 to the leading end surface 46 of the protrusion 45 for supporting in a natural state with no load which state is illustrated in FIG. 4.

Accordingly, when the holding plate 35 is attached and fixed to the stay 10 with a screw or the like, the protrusion 45 for supporting of the light shielding member 40 receives a load in such a manner as to be sandwiched between the ring-shaped groove 14 of the stay 10 and the recessed receiving part 37 of the holding plate 35 and is compressively deformed. The protrusion 45 for supporting is held in the position by the pressure from the members 10 and 35. In this case, it is preferable that the front end surface 43 which is a surface in contact with the ring-shaped groove 14 of the stay 10 and the leading end surface 46 of the protrusion 45 for supporting which surface is in contact with the recessed receiving part 37 of the holding plate 35 are arranged on a surface orthogonal to the optical axis O and that the protrusion 45 for supporting is compressed in a direction of the optical axis O.

On the other hand, specifically, in a case of the stereo camera 1, a shooting direction of the reference imaging module 5 and that of the other imaging module 5 are preferably the same. Thus, in each of the imaging modules 5, it is necessary to adjust positions of the lens (optical axis O) and the imaging surface 26.

As described above, in the present embodiment, in a case of attaching and fixing the holding plate 35 (and substrate 30) to the stay 10, a position thereof (position in direction of optical axis O, in direction orthogonal to optical axis O, and in rotational direction) is adjusted. Here, in a case where a surface (which is leading end surface 46 of protrusion 45 for supporting) in contact with the recessed receiving part 37 of the holding plate 35 is too large, the light shielding member 40 is deformed and a position or a shape of the rectangular window 44 for limiting an optical path is changed when the holding plate 35 is moved for adjustment. Thus, even desired light among light that becomes incident through the lens may be blocked.

Thus, in order to prevent the light shielding member 40 from being deformed even when the holding plate 35 is moved, it is preferable that the total area of a surface (which is leading end surface 46 of eight protrusions 45 for supporting) in contact with the recessed receiving part 37 of the holding plate 35 is much smaller than the total area of the front end surface 43 of the base part 41 which surface is in contact with the ring-shaped groove 14 of the stay 10 and that the surface in contact with the recessed receiving part 37 of the holding plate 35 has, similarly to the illustrated half-barrel-shaped or truncated cone-shaped protrusion 45 for supporting which protrusion becomes smaller on a leading end side, a shape with which only a leading end is deformed and a position or a shape of the window for limiting an optical path 44 is not changed when a load is applied.

Also, it is preferable that an arbitrary space is formed between the protrusion 45 for supporting of the light shielding member 40 and an inner surface of the recessed receiving part 37 of the holding plate 35 in such a manner that the holding plate 35 can be moved for a necessary degree in a direction orthogonal to the optical axis O during the positional adjustment.

Next, a function and an effect of the light shielding member 40 will be described.

A function necessary for the light shielding member 40 is to prevent undesired extraneous light from entering the imaging surface 26 of the imaging element 25. For example, as indicated by arrows J and K in FIG. 2, it is considered that the extraneous light becomes incident through a path between the stay 10 and the holding plate 35 and a path between the holding plate 35 and the substrate 30. In order to block the light, for example, the first protrusion 51 for light shielding is provided.

Accordingly, it is possible to prevent the light from directly entering the imaging surface 26 of the imaging element 25 and to prevent the extraneous light from entering the imaging surface 26 with the small number of times of reflection.

For example, in a case where the extraneous light reaches the imaging surface 26 after ten times of multiple reflection, when a color or material with low reflectivity such as black rubber is used as the light shielding member 40 and reflectivity in one time of reflection is 0.1 times, the extraneous light can be reduced to $0.1^{10}$ times in a case of ten times of reflection.

Here, when the first protrusion 51 for light shielding is in contact with the substrate 30 or the cover glass 23, a higher light-shielding property can be acquired. However, in this case, when there is a contact, for example, with an outer peripheral part of the cover glass 23, a load is applied to the cover glass 23 especially during assembly or in an environment of high temperature. By the load, a load is applied to the BGA solder ball 27. Thus, durability of the BGA solder with respect to thermal shock or the like may be decreased.

Thus, in the embodiment of the present invention, a structure in which the first protrusion 51 for light shielding is not in contact with the imaging element assembly 20 (imaging element 25) or the substrate 30 is included. With this structure, no load is applied to the BGA solder ball 27 of the imaging element 25 or the substrate 30 on which the imaging element 25 is mounted. Thus, even in an environment with a large temperature change or in an environment of high temperature in a vehicle, it is possible to reduce a malfunction in the solder junction 27 and the like of imaging element 25 and to improve durability and reliability.

In this case, it is expected that light shielding performance is adequate. As described above, light can be reduced to $0.1^{10}$ times or more. Thus, even when there is a gap S1 or S2 between the first protrusion 51 for light shielding and the substrate 30 or the second protrusion 52 for light shielding and the cover glass 23 of the imaging element assembly 20, the adequate light shielding performance can be secured.

Note that when the adequate light shielding performance can be acquired only with the first protrusion 51 for light shielding, the second protrusion 52 for light shielding is not necessarily provided. Only when it is not possible to acquire the adequate light shielding performance only with the first protrusion 51 for light shielding due to a limit or the like in a size or shape of each part, the second protrusion 52 for light shielding may be provided.

The second protrusion 52 for light shielding is preferably provided in a position without multiple reflection in which position the light reduced by the first protrusion 51 for light shielding does not reach the imaging surface 26. As illustrated in the drawing, the second protrusion 52 for light shielding is preferably arranged near the outer peripheral part of the cover glass 23 of the imaging element assembly 20. However, as described above, similarly to the first protrusion 51 for light shielding, a height or the like of the second protrusion 52 for light shielding is set in such a manner not to be in contact with the imaging element assembly 20 or the substrate 30.

As illustrated in the drawing, the first protrusion 51 for light shielding and the second protrusion 52 for light shielding are preferably ring-shaped (continuous in whole circumference). However, when the adequate light shielding performance can be acquired, a notched ring shape (discontinuous shape) may be employed.

The surface in contact with the ring-shaped groove 14 of the stay 10 may be one surface (whole front end surface 43) as illustrated in the drawing or may be divided into a plurality of surfaces. Also, the surface in contact with the recessed receiving part 37 of the holding plate 35 may be divided into a plurality of surfaces (leading end surface 46 of eight protrusions 45 for supporting) as illustrated in the drawing or may be one surface (for example, ring-shaped protrusion which becomes thinner on leading end side may be included instead of eight protrusions 45 for supporting).

Note that in the above embodiment, the protrusions for light shielding 51 and 52 of the light shielding member 40 are placed near the imaging element assembly 20. However, for example, the protrusions for light shielding may not be placed near the imaging element assembly 20 and may be placed on an outer peripheral side of the holding plate 35 to block extraneous light in a position far from the imaging element 25.

Also, in the above embodiment, the holding plate 35 that holds the substrate 30 is attached and fixed to the stay 10 after adjustment of a position. However, this is not the limitation. The stay and the holding plate may be integrated (light shielding member is positioned and assembled therebetween before or after integration) and the substrate may be moved with respect to the holding plate in the adjustment of a position. In this case, a protrusion for light shielding of the light shielding member is not in contact with the substrate and the imaging element assembly (imaging element). Thus, similarly to the above embodiment, no load is applied to the BGA solder ball of the imaging element or the substrate on which the imaging element is mounted and it becomes possible to reduce a malfunction in the solder junction and the like of the imaging element even in an environment with a large temperature change or an environment of high temperature. As a result, it is possible to improve durability and reliability.

Also, for example, when structural strength (rigidity) of the substrate itself is increased, the holding plate becomes unnecessary. In this case, the substrate also functions as the holding plate and a position is adjusted by moving the substrate with respect to the stay. Even in this case, the protrusion for light shielding of the light shielding member is not in contact with the substrate and the imaging element assembly (imaging element). Thus, an effect similar to that of the above embodiment can be acquired.

Note that the present invention is not limited to the above embodiments and various modified examples are included.

For example, the above embodiments are described in detail to describe the present invention in an easily-understandable manner. The present invention is not limited to what includes all of the above-described configurations.

Also, it is possible to replace a part of a configuration of an embodiment with a configuration of a different embodiment and to add a configuration of a different embodiment to a configuration of an embodiment.

Also, with respect to a part of a configuration of each embodiment, a different configuration can be added, deleted, or replaced.

REFERENCE SIGNS LIST 1 stereo camera
5 imaging module
10 stay (lens holding member)
12 cylindrical mount part
14 ring-shaped groove
15 lens unit
16 lens holder
20 imaging element assembly
23 cover glass
25 imaging element
26 imaging surface
27 BGA solder ball
30 substrate
35 holding plate (substrate holding member)
37 recessed receiving part
40 light shielding member
41 base part
42 top part
43 front end surface (contact surface)
44 rectangular window for limiting optical path
45 protrusion for supporting
46 leading end surface (contact surface)
51 first protrusion for light shielding
52 second protrusion for light shielding

The invention claimed is:

1. An imaging module comprising:
a lens;
a lens holding member that holds the lens;
an imaging element to convert light, which becomes incident through the lens, into an electric signal;
a substrate on which the imaging element is mounted; and
a light shielding member on which a ring-shaped or notched ring-shaped protrusion for light shielding is provided to prevent extraneous light from entering an imaging surface of the imaging element, the light shielding member being held between the lens holding member and the substrate without the protrusion for light shielding coming into contact with a different member.

2. The imaging module according to claim 1, wherein in the light shielding member, a ring-shaped or notched ring-shaped first protrusion for light shielding and second protrusion for light shielding are provided to prevent extraneous light from entering the imaging surface of the imaging element, the shielding member being held between the lens holding member and the substrate without any of the first protrusion for light shielding and the second protrusion for light shielding coming into contact with a different member.

3. The imaging module according to claim 1, wherein the light shielding member includes a first contact surface pressed against the lens holding member, and a second contact surface pressed against the substrate or a substrate holding member that holds the substrate.

4. The imaging module according to claim 3, wherein an area of the first contact surface is larger than an area of the second contact surface.

5. The imaging module according to claim 3, wherein a protrusion for supporting, a leading end of which is the second contact surface, is provided in a protruded manner on the light shielding member.

6. The imaging module according to claim 3, wherein the light shielding member includes means to perform positioning in a rotational direction with respect to an optical axis of the lens.

7. The imaging module according to claim 3, wherein a material with flexibility and elasticity such as silicone rubber is used as a material of the light shielding member.

8. The imaging module according to claim 3, wherein in a state in which the first contact surface is pressed against the lens holding member and the second contact surface is pressed against the substrate holding member, the substrate holding member can be moved at least in a direction orthogonal to an optical axis of the lens and a position thereof can be adjusted.

9. The imaging module according to claim 3, wherein in a state in which the first contact surface is pressed against the lens holding member and the second contact surface is pressed against the substrate, the substrate can be moved at least in a direction orthogonal to an optical axis of the lens and a position thereof can be adjusted.

10. The imaging module according to claim 1, wherein the lens holding member and a substrate holding member that holds the substrate are integrated,
the light shielding member is positioned and assembled between the lens holding member and the substrate holding member, and
the substrate can be moved, with respect to the substrate holding member, at least in a direction orthogonal to an optical axis of the lens and a position thereof can be adjusted.

11. A stereo camera for a vehicle comprising:
a pair of right and left imaging modules according to claim 1.

12. A light shielding member for an imaging module, comprising:
a ring-shaped base part; and
a top part protruded from the base part in a direction orthogonal thereto,
wherein in the top part, a window for limiting an optical path, a ring-shaped or notched ring-shaped protrusion for light shielding which protrusion is protruded in the direction orthogonal to the base part, and a protrusion for supporting which protrusion is smaller on a leading end side and is protruded in the direction orthogonal to the base part are provided.

* * * * *